United States Patent
Shin et al.

(10) Patent No.: US 9,163,119 B2
(45) Date of Patent: Oct. 20, 2015

(54) METHOD FOR PREPARING POLYARYLENE SULFIDE WITH REDUCED FREE IODINE CONTENT

(75) Inventors: Yong-Jun Shin, Seoul (KR); Sung-Gi Kim, Gyeonggi-do (KR); Jae-Bong Lim, Gyeonggi-do (KR); Joon-Sang Cho, Gyeonggi-do (KR); Il-Hoon Cha, Gyeonggi-do (KR)

(73) Assignee: SK Chemicals Co., Ltd. (KR)

( * ) Notice: Subject to any disclaimer, the term of this patent is extended or adjusted under 35 U.S.C. 154(b) by 207 days.

(21) Appl. No.: 13/142,932

(22) PCT Filed: Dec. 28, 2009

(86) PCT No.: PCT/KR2009/007831
§ 371 (c)(1),
(2), (4) Date: Jun. 30, 2011

(87) PCT Pub. No.: WO2010/077039
PCT Pub. Date: Jul. 8, 2010

(65) Prior Publication Data
US 2011/0269935 A1 Nov. 3, 2011

(30) Foreign Application Priority Data
Dec. 31, 2008 (KR) .................. 10-2008-0137680

(51) Int. Cl.
C08G 75/14 (2006.01)
C08G 75/02 (2006.01)
C08G 75/00 (2006.01)

(52) U.S. Cl.
CPC ........ C08G 75/0213 (2013.01); C08G 75/0263 (2013.01); C08G 75/0268 (2013.01)

(58) Field of Classification Search
CPC ....................................... C08G 75/14
USPC ...... 528/389, 381, 373, 500, 501, 502 R, 503
See application file for complete search history.

(56) References Cited

U.S. PATENT DOCUMENTS

| | | |
|---|---|---|
| 2,513,188 A | 6/1950 | Macallum |
| 2,583,941 A | 1/1952 | Gordon, Jr. |
| 4,746,758 A | 5/1988 | Rule et al. |
| 4,786,713 A | 11/1988 | Rule |
| 4,857,629 A | 8/1989 | Rule et al. |
| 4,945,155 A | 7/1990 | Fagerburg et al. |
| 4,952,671 A | 8/1990 | Fagerburg et al. |
| 5,256,715 A | 10/1993 | Harry |
| 8,242,233 B2 | 8/2012 | Lee et al. |
| 8,492,502 B2 | 7/2013 | Lee et al. |
| 2009/0203872 A1 | 8/2009 | Lee et al. |
| 2010/0022743 A1 | 1/2010 | Lee et al. |
| 2011/0257363 A1 | 10/2011 | Shin et al. |

FOREIGN PATENT DOCUMENTS

| | | |
|---|---|---|
| JP | 03-506047 A | 12/1991 |
| JP | 04-503967 A | 7/1992 |
| JP | 10275577 A | 10/1998 |
| JP | 2009280794 A | 12/2009 |
| JP | 2010-501661 A | 1/2010 |
| JP | 2010-515781 A | 5/2010 |
| JP | 2010-515782 A | 5/2010 |
| JP | 2012-513492 A | 6/2012 |
| KR | 10-2008-0018770 A | 2/2008 |
| WO | WO-90/10664 A1 | 9/1990 |
| WO | WO-2008/023915 A1 | 2/2008 |
| WO | WO-2008/082265 A1 | 7/2008 |
| WO | WO-2008/082267 A1 | 7/2008 |

OTHER PUBLICATIONS

"International Application Serial No. PCT/KR2009/007831, International Search Report mailed Aug. 19, 2010", (w/ English Translation), 11 pgs.
"Japanese Application Serial No. 2011-543437, Office Action mailed Sep. 17, 2013", 3 pgs.
"European Application Serial No. 09836360.9, European Search Report mailed Jul. 15, 2015", 5 pgs.

*Primary Examiner* — Duc Truong
(74) *Attorney, Agent, or Firm* — Schwegman Lundberg & Woessner, P.A.

(57) ABSTRACT

The present invention relates to a method for preparing polyarylene sulfide with a reduced free iodine content. More specifically, the method for preparing polyarylene sulfide includes: (a) polymerizing reactants including a diiodo aromatic compound and a sulfur compound to form a polyarylene sulfide; and (b) maintaining the polyarylene sulfide product at 100 to 260° C. for heat-setting. The preparation method of the present invention effectively reduces the free iodine content of the polyarylene sulfide to prevent potential corrosion of facilities for the subsequent process and improves the properties of the polyarylene sulfide product such as thermal stability, so the method can be usefully applied to industrial fields in regard to the preparation of polyarylene sulfide.

11 Claims, No Drawings

METHOD FOR PREPARING POLYARYLENE SULFIDE WITH REDUCED FREE IODINE CONTENT

CROSS REFERENCE TO RELATED APPLICATION

This application is a nationalization under 35 U.S.C. 371 of PCT/KR2009/007831 filed Dec. 28, 2009 and published as WO 2010/077039 A2 on Jul. 8, 2010, which application claims priority to and the benefit of Korean Patent Application No. 10-2008-0137680, filed Dec. 31, 2008, which applications and publication are incorporated herein by reference in their entirety.

BACKGROUND OF THE INVENTION (a) Field of the Invention

The present invention relates to a method for preparing polyarylene sulfide and, more particularly, to a method for preparing polyarylene sulfide having a low iodine content and enhanced properties.

(b) Description of the Related Art

As a typical engineering plastic, polyarylene sulfide has recently been in considerable demand as a material for high temperature and corrosive environments and electronics products due to its excellence in thermal resistance, chemical resistance, flame resistance, and electrical insulation properties. Polyarylene sulfide is primarily used for computer parts, automotive components, protective coatings against corrosive chemicals, industrial chemical resistant fabrics, and so forth.

The only polyarylene sulfide that is commercially available is polyphenylene sulfide (hereinafter, referred to as "PPS"). The current industrial synthesis process for PPS involves a reaction of p-dichlorobenzene (hereinafter, referred to as "pDCB") and sodium sulfide in a polar organic solvent such as N-methyl pyrrolidone. This process is known as "Macallum process", which is disclosed in U.S. Pat. Nos. 2,513,188 and 2,583,941. Among several polar solvents suggested in the prior art, the mostly used one is N-methylpyrrolidone. The process uses dichloro aromatic compounds as a reactant and yields sodium chloride as a byproduct.

The PPS produced in the Macallum process has a molecular weight around 10,000 to 40,000 and a low melt viscosity less than 3,000 poise. For higher melt viscosity, PPS is usually subjected to the curing process including application of heat below the melting temperature Tm and exposure to oxygen. During the curing process, the melt viscosity of PPS can be raised to a level required for general PPS uses through reactions such as oxidation, cross-bonding, or polymer chain extension.

The PPS obtained in the conventional Macallum process, however, has some fundamental disadvantages as follows.

Firstly, the use of sodium sulfide as a supply of sulfur needed in the polymerization reaction leads to a large amount of metal salt such as sodium chloride as a byproduct in the polymer product. The residual metal salt is contained in the polymer product to several thousand ppm even after the polymer product is washed out, not only to raise the electrical conductivity of the polymer but also to cause corrosion of the processing machinery and problems during spinning of the polymer into fibers. From the standpoint of the manufacturer, the use of sodium sulfide as an ingredient material ends up with the 52%-yield of sodium chloride as a byproduct with respect to the weight of the added material, and the byproduct, sodium chloride, is not economical but wasteful even when recycled.

Secondly, the properties of the polymer product are adversely affected during the curing process. For example, oxygen-driven oxidation and cross-bonding reactions turn the polymer product darker with more brittleness in the aspect of mechanical property.

Thirdly, like all the polymer products of solution polymerization, the final PPS product is prepared in a very fine powder form that relatively lowers the apparent density, causing inconvenience in carrying and some problems during the processing of the PPS into desired goods.

Beside the Macallum process, some other processes have been proposed in U.S. Pat. Nos. 4,746,758 and 4,786,713 and other related patents. These patents suggest that polyarylene sulfide can be prepared by directly heating diiodo compounds and solid sulfur rather than dichloro compounds and metal sulfide used in the existing process without using any polar solvent. This method consists of two steps, iodization and polymerization: the iodization step involves a reaction of aryl compounds and iodine to form a diiodo compound, and the polymerization step includes a reaction of the diiodo compound and solid sulfur to yield polyarylene sulfide having a high molecular weight. During the reaction, there occurs production of iodine in vapor form, which iodine is collectible and reused to react with the aryl compounds again. Hence, the iodine substantially acts like a catalyst in the reaction.

This method can solve the problems with the conventional processes. First, iodine yielded as a byproduct does not raise the electrical conductivity of the polyarylene sulfide product as metal salts usually do, and can be easily collected from the reactants to readily make its content in the final product lower than the content of metal salts in the conventional processes. The collected iodine is reusable in the iodization step, reducing the quantity of waste almost to zero. Second, the polymerization step using no solvent provides the polyarylene sulfide product in the pellet form like the conventional polyester product, avoiding a problem with the product in the powder form according to the prior art. Finally, this method raises the molecular weight of the final polyarylene sulfide product far more than the conventional processes and thus eliminates a need for the curing process that leads to inferior properties of the product.

This process however has two main disadvantages. First, the residual iodine in the molecular state is so corrosive to adversely affect the processing machinery when it is contained in the final polyarylene sulfide product even in a minute amount. Second, the use of solid sulfur in the polymerization step causes introduction of disulfide bonds in the final polyarylene sulfide product to deteriorate the thermal properties of the product including melting temperature.

Consequently, there is a need for studies to develop a method for effectively preparing polyarylene sulfide that not only considerably lowers the content of iodine causing corrosion of machinery but also provides excellent properties such as thermal resistance, chemical resistance, and mechanical strength.

SUMMARY OF THE INVENTION

Accordingly, it is an object of the present invention to provide a method for preparing polyarylene sulfide having a low iodine content and good thermal stability.

It is another object of the present invention to provide a polyarylene sulfide resin having a low iodine content and good thermal stability.

It is still another object of the present invention to provide molded products, films, sheets or fabrics consisting of the polyarylene sulfide resin.

The present invention provides a method for preparing polyarylene sulfide that includes: (a) polymerizing reactants including a diiodo aromatic compound and a sulfur compound to form a polyarylene sulfide; and (b) maintaining the polyarylene sulfide at 100 to 260° C. for heat-setting.

The present invention also provides a polyarylene sulfide prepared by the above method and having a free iodine content of at most 20 ppm, and a molded product using the polyarylene sulfide.

DETAILED DESCRIPTION OF THE EMBODIMENTS

The term "heat-setting" as used herein refers to a process of maintaining the solid phase of a polymer product, particularly the solid 'polyarylene sulfide' in the present invention, under a defined temperature condition by heating. Hereinafter, a description will be given about the present invention in further detail.

The inventors of the present invention noticed the problems pertaining to the preparation method for polyarylene sulfide according to the prior art and focused on the solutions based on chemical methods. The reason for removing iodine from the final polymer product lies in the economical aspect as well as corrosiveness of the iodine. The way that iodine gets in the polymer product during the above-described new process falls into two cases: the one case of having iodine molecules directly included in the polymer; and the other having iodine atoms bonded to the aryl group of the polymer. The present invention has a focus on the solution of the former case of problem.

In particular, the present invention relates to a method for preparing polyarylene sulfide that not only reduces the content of residual iodine in the final polymer product during polymerization but also maintains the properties of the polyarylene sulfide to an equivalent or improved level.

In accordance with an embodiment of the present invention, there is provided a method for preparing polyarylene sulfide that includes: (a) polymerizing reactants including a diiodo aromatic compound and a sulfur compound to form a polyarylene sulfide; and (b) maintaining the polyarylene sulfide at 100 to 260° C. for heat-setting. The inventors of the present invention have found out that the heat-setting step carried on the polyarylene sulfide after the polymerization step can minimize not only variations of thermal stability and melt viscosity but also the content of iodine remaining in the polyarylene sulfide. The term "heat-setting" as used herein refers to the process of maintaining the polymer product in the solid state under a constant temperature condition.

The polymerization step is carried out under temperature and pressure conditions that may initiate polymerization of the reactants but are not specifically limited. Preferably, the polymerization reaction proceeds for 1 to 30 hours under initial reaction conditions, a temperature of 180 to 250° C. and a pressure of 50 to 450 torr, and then under final reaction conditions, an elevated temperature of 270 to 350° C. and a reduced pressure of 0.001 to 20 torr. In case of polymerization performed under temperature and pressure conditions changing from the initial reaction conditions to the final reaction conditions, the polymerization reaction rate gets faster and the polymer product, polyarylene sulfide, has improved qualities in regard to thermal stability and mechanical properties.

The final polymer product, polyarylene sulfide, prepared according to the embodiment of the present invention not only has a free iodine content at most 20 ppm, preferably at most 10 ppm but also shows equivalent or better properties in regard to melt viscosity and melting temperature, compared to the polyarylene sulfide prepared in the prior art.

Preferably, the polyarylene sulfide has a variation of melt viscosity less than 35% and a variation of melting temperature less than 5% before and after the heat-setting step. More preferably, the polyarylene sulfide has a variation of melt viscosity less than 20% and a variation of melting temperature less than 3%.

Here, the content of iodine in the polyarylene sulfide product is lowered to 20 ppm or less to almost eliminate the risk of corrosion in the processing equipment relative to the prior art. The polyarylene sulfide has a melting temperature Tm of 265 to 320° C., preferably 268 to 290° C., more preferably 270 to 285° C. By securing the melting temperature Tm in such a high range, the polyarylene sulfide of the present invention applied as an engineering plastic can exert good performances such as high strength and enhanced thermal resistance.

The polyarylene sulfide prepared as the final product in accordance with the embodiment of the present invention has a melt viscosity in the range of 100 to 100,000 poise, preferably 150 to 5,000 poise, more preferably 200 to 20,000 poise, most preferably 300 to 15,000 poise. By securing such an enhanced melt viscosity, the polyarylene sulfide applied as an engineering plastic can realize good performances such as high strength and enhanced thermal resistance.

The diiodo aromatic compound as used in the preparation method of polyarylene sulfide according to the embodiment of the present invention includes, but is not limited to, at least one selected from diiodobenzene (DIB), diiodonaphthalene, diiodobiphenyl, diiodobisphenol, or diiodobenzophenone. The diiodo aromatic compound may also be any one of these diiodo aromatic compounds that has an alkyl or sulfone substituent; or an aryl compound containing an oxygen or nitrogen atom. The diiodo aromatic compound can form distinctly different kinds of isomers according to the position of iodine substituents. The most preferable isomer of the diiodo compound is a compound having iodine substituents symmetrically positioned on both ends of the molecular and separated at the longest distance from each other, such as pDIB, 2,6-diiodonaphthalene, or p,p'-diiodobiphenyl.

The sulfur compound as used herein is not specifically limited in its form, but solid sulfur is preferred. Normally, sulfur exists as cyclooctasulfur (S8) in the form of a ring consisting of eight sulfur atoms. Though, the sulfur compound may be any kind of solid sulfur commercially available.

The diiodo aromatic compound may be added in an amount of at least 0.9 moles with respect to the sulfur compound. The content of the sulfur compound is preferably 15 to 30 wt. % with respect to the weight of the polyarylene sulfide that is prepared from the diiodo aromatic compound and the sulfur compound via polymerization. The content of the sulfur compound within the above range ends up with a yield of polyarylene sulfide having enhanced thermal resistance and chemical resistance and excellent properties in regard to physical strength.

The reactants may further include a polymerization inhibitor in order to regulate the molecular weight of the polyarylene sulfide. The polymerization inhibitor is used to prevent overload on the reactor caused by an excessive increase in the molecular weight of the polyarylene sulfide during the polymerization process and to make the final polymer product preferable in the processing.

The polymerization inhibitor as used herein may include at least one selected from the group consisting of monoiodoaryl compounds, benzothiazoles, benzothiazolesulfenamides, thiurams, dithiocarbamates, and diphenylsulfide.

More preferably, the polymerization inhibitor may include, but is not limited to, at least one selected from the group consisting of iodobiphenyl, iodophenol, iodoaniline, iodobenzophenone, 2-mercaptobenzothiazole, 2,2'-dithiobisbenzothiazole, N-cyclohexylbenzothiazole-2-sulfenamide, 2-morpholinothiobenzothiazole, N,N-dicyclohexyl-2-benzothiazole sulfenamide, tetramethylthiuram monosulfide, tetramethylthiuram disulfide, zinc dimethyldithiocarbamate, zinc diethyldithiocarbamate, and diphenyl disulfide.

The added amount of the polymerization inhibitor, if not specifically limited, is 0.01 to 10.0 wt. %, preferably 0.1 to 5.0 wt. % with respect to the weight of the polyarylene sulfide. The added amount of the polymerization inhibitor less than 0.01 wt. % has little effect, while the added amount of the polymerization inhibitor more than 10.0 wt. % tends to lower the viscosity of the polyarylene sulfide and deteriorates the profitability due to the use of an excess of raw materials.

On the other hand, the preparation method of polyarylene sulfide according to the embodiment of the present invention may further include a step of melt-mixing the diiodo aromatic compound and the sulfur compound prior to the polymerization step. The polymerization step involves a melt polymerization reaction without using an organic solvent. To activate the melt polymerization reaction, the reactants including the diiodo aromatic compound and the sulfur compound are melt-mixed together prior to polymerization.

If not specifically limited, the melt mixing step is carried out under any condition that allows the reactants to completely melt-mix together, preferably at 150 to 250° C.

In the embodiment of the present invention, the polymerization step is performed in the presence of a nitrobenzene-based catalyst. When the melt-mixing step is added prior to the polymerization reaction, the nitrobenzene-based catalyst is included in the reactants and subjected to the melt-mixing step. Likewise, the polymerization inhibitor when included in the reactant can also be added along with the reactant during the melt-mixing step.

The inventors of the present invention found out that the polyarylene sulfide prepared by polymerization in the presence of a reaction catalyst had a higher melting temperature than the PPS homopolymer prepared from pDIB and sulfur without using a catalyst. The low melting temperature of polyarylene sulfide results in poor thermal resistance of the product prepared from the polyarylene sulfide, so the selection of an appropriate reaction catalyst is of great importance. The examples of the reaction catalyst as used herein may include, but are not limited to, nitrobenzene-based catalysts, preferably 1,3-diiodo-4-nitrobenzene or 1-iodo-4-nitrobenzene.

In case of using such a nitrobenzene-based catalyst in the polymerization, the content of the catalyst is, if not specifically limited to, 0.01 to 5 wt. %, preferably 0.05 to 2 wt. %, more preferably 0.1 to 1 wt. % with respect to the weight of the polyarylene sulfide product. The content of the catalyst less than 0.01 wt. % has little effect on the polymerization, while the content of the catalyst greater than 5 wt. % lowers the profitability due to an excess of the raw material used, consequently deteriorating the properties of the polyarylene sulfide product in regard to strength.

The heat-setting step of the polyarylene sulfide product is carried out under temperature condition of 100 to 260° C. The heat-setting process at below 100° C. has little effect of reducing the free iodine content, while the heat-setting process at 260° C. or above is of no avail because the polymer product is melt or fused.

The temperature condition of the heat-setting step is more preferably 130 to 250° C., most preferably 150 to 230° C. The higher the heat-setting temperature, the shorter the heat-setting time required for reducing the iodine content below a certain level.

The heat-setting time can be controlled in the range of 0.5 to 100 hours, preferably 1 to 40 hours, in consideration of the heat-setting temperature.

The heat-setting process is carried out in a natural atmospheric environment, preferably in an atmosphere purged with at least one gas selected from the group consisting of nitrogen, air, helium, argon, and water vapor. The heat-setting in the gas atmosphere advantageously increases the free iodine reduction rate to shorten the heat-stetting time.

Preferably, the heat-setting process may be carried out under vacuum condition, in which case the free iodine reduction rate is increased to desirably shorten the heat-setting time.

In accordance with another embodiment, the present invention provides a polyarylene sulfide prepared by the above method and having a free iodine content at most 20 ppm. The free iodine content of the polyarylene sulfide is preferably at most 10 ppm.

The polyarylene sulfide according to the embodiment of the present invention has a melting temperature of 265 to 320° C. and a melt viscosity of 200 to 20,000 poise.

The present invention also provides a product prepared by molding the polyarylene sulfide according to the embodiment, and the product may be provided in the form of molded products, films, sheets, or fabrics.

The polyarylene sulfide of the present invention may be processed into any kind of molded products by injection molding or extrusion molding. The examples of the molded products may include injection-molded products, extrusion-molded products, or blow molded products. As for injection molding, the molding temperature is preferably at least 30° C., more preferably at least 60° C., most preferably at least 80° C. in the aspect of crystallization; and preferably at most 150° C., more preferably at most 140° C., most preferably at most 130° C. in the aspect of the deformation of test species. These molded products may be used as electrical/electronic parts, building components, automotive components, mechanical parts, daily-use articles, and so forth.

The films or sheets may be prepared in the form of any kind of films such as non-oriented film, or uni-axially or bi-axially oriented film, or sheets. The fabrics may be prepared in the form of any kind of fabrics such as non-oriented fabric, oriented fabric, or ultra-oriented fabric, and used as woven fabric, knitted fabric, nonwoven fabric (spoon bond, melt blow, or staple), ropes, nets, or the like.

Hereinafter, the present invention will be described in further detail with reference to the examples and comparative examples, which are not intended to limit the scope of the present invention.

PREPARATION EXAMPLES

Polymerization of Polyarylene Sulfide

Preparation Example 1

Polyarylene Sulfide

A mixture including 300.00 g of pDIB and 27.00 g of sulfur was heated to 180° C. Completely melt and mixed, the mixture was polymerized for 8 hours under initial conditions of a temperature of 220° C. and a pressure of 200 Torr and then under final conditions of an elevated temperature of 320° C. and a reduced pressure of at most 1 Torr.

The polymer product had melt viscosity MV 10,000 poise, melting temperature Tm 235.5° C., iodine content 7,000 ppm, and free iodine content 100 ppm.

Preparation Example 2

Polyarylene Sulfide

The procedures were carried out to accomplish a polymerization reaction under the same conditions of Preparation Example 1, excepting that 1.50 g of 4-iodobiphenyl was added when pDIB and sulfur were melt-mixed.

The polymer product had melt viscosity MV 2,600 poise, melting temperature Tm 235.0° C., iodine content 1,500 ppm, and free iodine content 85 ppm.

Preparation Example 3

Polyarylene Sulfide

The procedures were carried out to accomplish a polymerization reaction under the same conditions of Preparation Example 1, excepting that 1.10 g of 2,2'-dithiobisbenzothiazole (MBTS) was added when pDIB and sulfur were melt-mixed.

The polymer product had melt viscosity MV 2,200 poise, melting temperature Tm 245.5° C., iodine content 670 ppm, and free iodine content 70 ppm.

Preparation Example 4

Polyarylene Sulfide

The procedures were carried out to accomplish a polymerization reaction under the same conditions of Preparation Example 1, excepting that 0.60 g of PDS and 0.3 g of 1,3-diiodo-4-nitrobenzene as a catalyst were added when pDIB and sulfur were melt-mixed.

The polymer product had melt viscosity MV 5,300 poise, melting temperature Tm 274.3° C., iodine content 610 ppm, and free iodine content 80 ppm.

In Table 1, there are presented the properties of the polyarylene sulfide obtained in the preparation examples and the polymerization initiator used for the polymerization.

COMPARATIVE EXAMPLES

Comparative Example 1

The procedures were carried out to accomplish a polymerization reaction under the same conditions of Preparation Example 1, excepting that the polymerization reaction time was extended in the reaction step under at most 1 torr (320° C.) and carried out for 14 hours in total.

The polymer product had melt viscosity MV 9,800 poise, melting temperature Tm 237.5° C., iodine content 7,500 ppm, and free iodine content 75 ppm.

Comparative Example 2

The polymers obtained in Preparation Examples 1 to 4 were processed into 4 mm-long chips and analyzed in regard to the free iodine content over time under atmosphere purged with nitrogen at 25 to 50° C.

EXAMPLES

Example 1

The polymers obtained in Preparation Examples 1 to 4 were made into 4 mm-long chips, subjected to heat-setting each at 150 to 200° C. without a purging gas, and then analyzed in regard to the free iodine content.

Example 2

The polymers obtained in Preparation Examples 1 to 4 were made into 4 mm-long chips, subjected to heat-setting each at 150° C., 200° C. and 230° C. in the atmosphere purged with nitrogen ($N_2$), and then analyzed in regard to the free iodine content.

Example 3

The polymers obtained in Preparation Examples 1 to 4 were made into 4 mm-long chips, subjected to heat-setting each at 150° C., 200° C. and 230° C. in the atmosphere purged with air, and then analyzed in regard to the free iodine content.

Example 4

The polymers obtained in Preparation Examples 1 to 4 were made into 4 mm-long chips, subjected to heat-setting each at 150° C. and 200° C. under vacuum, and then analyzed in regard to the free iodine content.

In Table 2, there are presented the purging gas and the temperature condition for the heat-setting of the chips obtained in Comparative Examples and Examples, and the free iodine content (measured in the manner as described below) of the chips over the hat-setting time according to the purging gas and the temperature condition.

EXPERIMENTAL EXAMPLES

Property Measurement of Polymers of Preparation Examples and Chips of Comparative Examples and Examples 1. Melt Viscosity (MV)
   MV was measured at 300° C. with a rotating disk viscometer.
2. Melting Temperature (Tm)
   The melting temperature was determined with a differential scanning calorimeter (DSC).
3. Iodine Content
   Ion chromatography was used to measure the iodine content. More specifically, each sample was grinded, and a given amount of the sample was combusted and ionized in an adsorbent such as pure water. The concentration of iodine ions was then determined by the combustion ion chromatography, using a combustion system AQF-100 (Mitsubishi Corporation) and an IC system ICS-2500 (DIONEX Corporation).
4. Free Iodine Content Analysis
   For the free iodine analysis of the Preparation Examples, the Comparative Examples and the Examples, the samples were freeze-grinded, sonicated with methylene chloride at 50° C. for one hour and then subjected to quantitative analysis with U.V. (UV Spectrometer; Varion).

TABLE 1

| Preparation Example | Additive Polymerization Inhibitor | Catalyst | MV (poise) | Tm (° C.) | Iodine (ppm) | Free Iodine (ppm) |
|---|---|---|---|---|---|---|
| 1 | — | — | 10000 | 235.5 | 7000 | 100 |
| 2 | 4-ioddobiphenyl (1.50 g) | — | 2600 | 235.0 | 1500 | 85 |
| 3 | 2,2'-dithiobisbenzo-thiazole (1.10 g) | — | 2200 | 245.5 | 670 | 70 |
| 4 | Diphenyl Disulfide (0.60 g) | 1,3-diiodo-4-nitro-benzene (0.3 g) | 5300 | 274.3 | 610 | 80 |

TABLE 2

| | Purging Gas | Temperature (° C.) | Free Iodine Content (ppm) according to Heat-Setting Time (hr) | | | | | |
|---|---|---|---|---|---|---|---|---|
| | | | 0 hr | 1 hr | 3 hr | 20 hr | 50 hr | 100 hr |
| Comparative Example 1 | — | — | 75 | — | — | — | — | — |
| Comparative Example 2 | N₂ | 25 | 80 | 80 | 80 | 80 | 80 | 80 |
| | N₂ | 50 | 80 | 80 | 80 | 78 | 78 | 78 |
| Example 1 | — | 150 | 80 | 20 | 10 | 4 | 2 | N.D |
| | — | 200 | 80 | 15 | 8 | 3 | 2 | N.D |
| | — | 230 | 80 | 10 | 8 | 2 | N.D | — |
| Example 2 | N₂ | 150 | 80 | 18 | 10 | 2 | 1 | N.D |
| | N₂ | 200 | 80 | 15 | 10 | 2 | N.D | — |
| | N₂ | 230 | 80 | 11 | 8 | 3 | 1 | N.D |
| Example 3 | Air | 150 | 80 | 20 | 12 | 4 | 1 | 1 |
| | Air | 200 | 80 | 20 | 10 | 3 | N.D | — |
| | Air | 230 | 80 | 10 | 8 | 2 | 1 | N.D |
| Example 4 | Vacuum | 150 | 80 | 22 | 12 | 3 | N.D | — |
| | Vacuum | 200 | 80 | 17 | 12 | 2 | 1 | N.D |

TABLE 3

| | Heat-Setting Temperature (° C.) | Before Heat-Setting | | After Heat-Setting | |
|---|---|---|---|---|---|
| | | Melt Viscosity (Poise) | Melting Temperature (° C.) | Melt Viscosity (Poise) | Melting Temperature (° C.) |
| Comparative Example 2 | 25 | 5300 | 274.3 | 5300 | 274.3 |
| | 50 | 5300 | 274.3 | 5300 | 235.0 |
| Example 1 | 150 | 5300 | 274.3 | 5300 | 274.3 |
| | 200 | 5300 | 274.3 | 5600 | 273.5 |
| | 230 | 5300 | 274.3 | 6000 | 274.0 |
| Example 2 | 150 | 5300 | 274.3 | 5300 | 274.2 |
| | 200 | 5300 | 274.3 | 6000 | 274.0 |
| | 230 | 5300 | 274.3 | 7200 | 273.0 |
| Example 3 | 150 | 5300 | 274.3 | 5300 | 274.5 |
| | 200 | 5300 | 274.3 | 6300 | 272.0 |
| | 230 | 5300 | 274.3 | 7000 | 271.0 |
| Example 4 | 150 | 5300 | 274.3 | 5300 | 274.0 |
| | 200 | 5300 | 274.3 | 7000 | 272.0 |

As can be seen in Table 2, the heat-setting under the conditions in the Examples of the present invention reduced the free iodine content in the polyarylene sulfide to the level that hardly appears within the measurable concentration range.

In Table 3, there was almost little variation of the properties such as melt viscosity and melting temperature before and after the heat-setting process. In conclusion, the preparation method of polyarylene sulfide according to the present invention not only reduces the free iodine content but also had almost little effect on the properties of the polymer, so the present invention is widely applicable in the industrial fields in regard to the preparation of polyarylene sulfide.

What is claimed is:

1. A method for preparing a heat-set polyarylene sulfide having a melting temperature of 265 to 320° C. and a free iodine content of at most 20 ppm, comprising:
    (a) polymerizing reactants including a diiodo aromatic compound, a polymerization inhibitor, and a sulfur compound at an initial temperature of 180° C. to 250° C. and at a final temperature of 270° C. to 350° C. to form a polyarylene sulfide product; and (b) maintaining the polyarylene sulfide product at 150° C. to 230° C. for heat-setting for 0.5 to 100 hours to give a heat-set polyarylene sulfide;

wherein:

the heat-set polyarylene sulfide has a melting temperature of 265° C. to 320° C. and a free iodine content of at most 20 ppm;

the heat-set polyarylene sulfide has a melting temperature variation of less than 5% before and after the heat-setting step (b); and the polymerization inhibitor is at least one of N-cyclohexylbenzothiazole-2-sulfenamide, N,N-dicyclohexyl-2-benzothiazole sulfenamide, tetramethylthiuram monosulfide, tetramethylthiuram disulfide, zinc dimethyldithiocarbamate, zinc diethyldithiocarbamate, and diphenyl disulfide.

2. The method as claimed in claim 1, wherein the polymerization step (a) is carried out for 1 to 30 hours under an initial condition including a temperature of 180 to 250° C. and a pressure of 50 to 450 torr and then under a final condition including an elevated temperature of 270 to 350° C. and a reduced pressure of 0.001 to 20 torr.

3. The method as claimed in claim 1, wherein the sulfur compound is solid sulfur.

4. The method as claimed in claim 1, further comprising:
melt-mixing the diiodo aromatic compound and the sulfur compound prior to the polymerization step (a).

5. The method as claimed in claim 1, wherein the polyarylene sulfide has a melt viscosity variation of less than 35%.

6. The method as claimed in claim 1, wherein the polyarylene sulfide has a melt viscosity of 200 to 20,000 poise.

7. The method as claimed in claim 1, wherein the diiodo aromatic compound includes at least one selected from the group consisting of diiodobenzene, diiodonaphthalene, diiodobiphenyl, diiodobisphenol, and diiodobenzophenone.

8. The method as claimed in claim 1, wherein the polymerization step (a) is carried out in the presence of a nitrobenzene-based catalyst.

9. The method as claimed in claim 1, wherein the heat-setting step (b) is carried out in an atmosphere purged with at least one gas selected from the group consisting of nitrogen, air, helium, argon, and water vapor.

10. The method as claimed in claim 1, wherein the heat-setting step (b) is carried out under vacuum condition.

11. The method of claim 1, wherein the heat-setting step (b) is carried out for 1 to 40 hours.

* * * * *

UNITED STATES PATENT AND TRADEMARK OFFICE
CERTIFICATE OF CORRECTION

PATENT NO. : 9,163,119 B2
APPLICATION NO. : 13/142932
DATED : October 20, 2015
INVENTOR(S) : Shin et al.

It is certified that error appears in the above-identified patent and that said Letters Patent is hereby corrected as shown below:

Title Page (75), in "Inventors", in column 1, line 2, delete "Gyeonggi-do" and insert --Yongin-si--, therefor Title Page (75), in "Inventors", in column 1, line 3, delete "Gyeonggi-do" and insert --Anyang-si--, therefor Title Page (75), in "Inventors", in column 1, line 4, delete "Gyeonggi-do" and insert --Yongin-si--, therefor Title Page (75), in "Inventors", in column 1, line 5, delete "Gyeonggi-do" and insert --Gwacheon-si--, therefor Title Page (73), in "Assignee", in column 1, line 1, after "Ltd.", insert --, Kyungki-do--, therefor Signed and Sealed this
Fifth Day of April, 2016

Michelle K. Lee
*Director of the United States Patent and Trademark Office*